June 19, 1962 J. E. CAFARO 3,039,258
ENDLESS COTTON GATHERING DEVICE
Filed Oct. 13, 1958 2 Sheets-Sheet 2

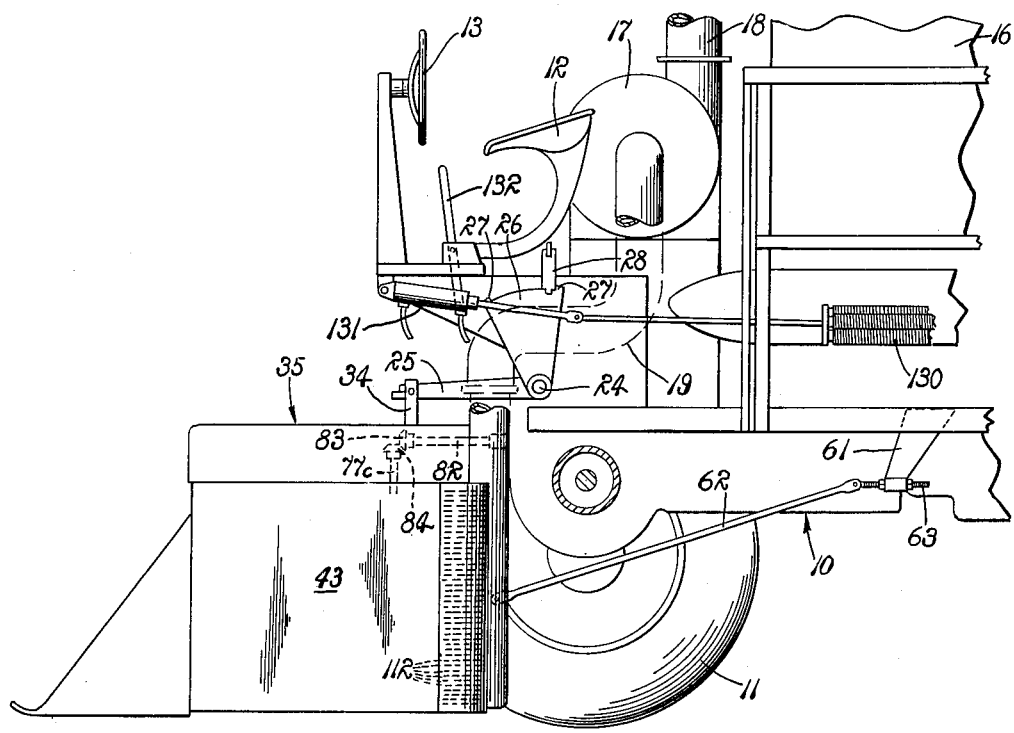

JOE E. CAFARO
INVENTOR
HUEBNER & WORREL
ATTORNEYS
BY
Richard M. Worrel

United States Patent Office 3,039,258
Patented June 19, 1962

3,039,258
ENDLESS COTTON GATHERING DEVICE
Joe E. Cafaro, Box 282, Tranquility, Calif.
Filed Oct. 13, 1958, Ser. No. 767,051
14 Claims. (Cl. 56—49)

The present invention relates to a material gathering apparatus and, more particularly, to improvements in a cotton picking machine.

Conventional modern cotton picking machines employ a picking unit having a pair of upright picking drums individually rotatably mounted on opposite sides of a picking zone through which cotton plants are compressibly gathered during earth traversing movement of the machine along the row of plants. Each of the drums usually mounts a plurality of upright picker bars, and a plurality of picker spindles are horizontally outwardly extended in longitudinally spaced relation along their respective bars. As is well-known, geared driving mechanism simultaneously rotates the picking drum about a vertical axis and rotates the spindles about their individual horizontal axes so as to carry the spindles in a circuitous path of travel sucecssively through the picking zone wherein cotton is wound around the spindles, and thence through a doffing zone wherein a doffer removes the cotton from the spindles. In order properly to orient the spindles in the picking and doffing zones, camming mechanism is provided for oscillating the spindles about their respective picker bar axes during movement in said circuitous path.

Although such conventional cotton pickers have been somewhat effective for their intended purposes, they have not been universally accepted in their current form, are regarded by many as requiring considerable improvements, and are subject to certain disadvantages, to which brief reference is made.

Obviously, the gears and other drive mechanisms required to operate the picking units are structurally intricate, require precise construction and adjustment, and, as a result, are subject to frequent maladjustment. Because of the many moving parts, the bearings and lubrication systems are quite involved and require frequent attention. Generally, there are approximately six-hundred spindles employed, each of which must be maintained in proper condition for optimum picking efficiency.

Again, because of the complex structure required, a conventional cotton picker may weigh as much as five tons and is exceedingly bulky and cumbersome to operate. More specifically, it is essential to hold the picking units in precise elevational position since if they are too low, the spindles engage the ground and become damaged or maladjusted, and if the elevational position is too high, the picking efficiency is impared. The spindles sometimes fail to wrap cotton effectively therearound, in which event incomplete picking occurs, and cotton sometimes becomes excessively wrapped and entangled on the spindles so as to make doffing difficult or incomplete. Obviously, the modern cotton picker is an expensive piece of equipment both in initial outlay and subsequent maintenance.

Accordingly, it is an object of the present invention to provide an improved apparatus for picking cotton and the like.

Another object is to simplify the construction, reduce the weight, and minimize the structural intricacies of mechanical cotton pickers.

Another object is to minimize the maintenance and adjustment requirements of mechanical cotton pickers.

Another object is to provide a cotton picking machine which is easier to control and maneuver than those previously employed.

Another object is to provide a machine for picking cotton which is durable and rugged in construction.

Another object is to provide a cotton picking machine having an effective picking action conducive to greater thoroughness in picking.

Another object is to minimize the cost of owning and operating mechanical cotton pickers.

These, together with other objects, will become more fully apparent upon reference to the following description and accompanying drawings.

In the drawings:

FIG. 1 is a fragmentary side elevation of a mechanical cotton picker embodying the principles of the present invention.

FIG. 2 is a somewhat enlarged vertical sectional view of the device taken on a plane at a position indicated by line 2—2 in FIG. 3.

Figure 3:
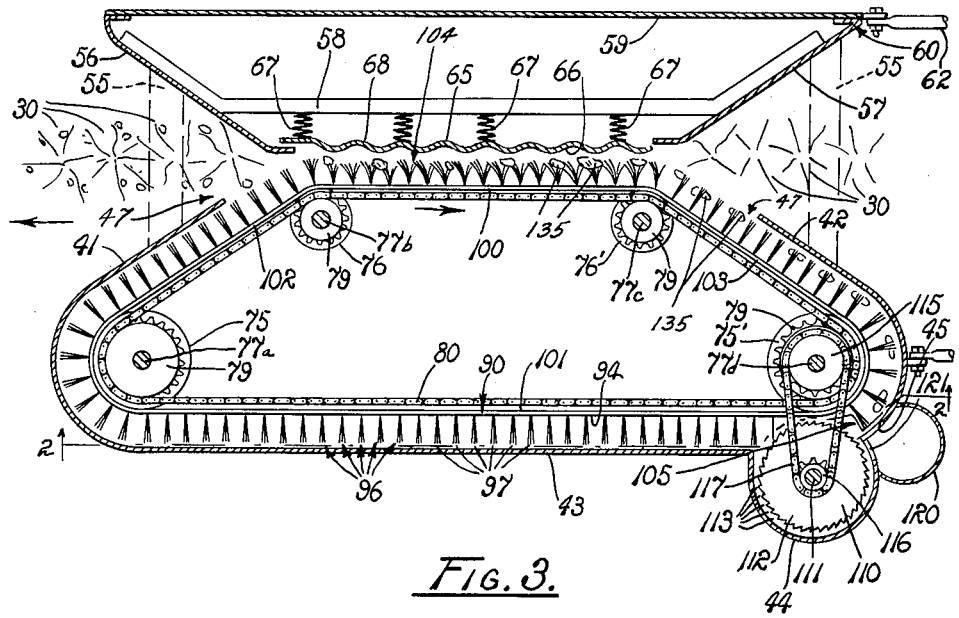
FIG. 3 is a somewhat enlarged horizontal sectional view of the device taken on a plane at a position represented by line 3—3 in FIG. 2 and also showing a row of plants whose cotton is adapted to be picked by the subject machine.

Referring more particularly to the drawings, a cotton picking machine is partially illustrated in FIG. 1 and includes a tractor 10 having forward drive wheels 11, an operator's seat 12 mounted in upwardly elevated position with respect to the drive wheels, and a steering wheel 13 forwardly of the seat.

A cotton collecting cage 16 is fragmentarily illustrated in FIG. 1 and is also supported on the tractor 10. A blower 17 is mounted adjacent to the cage and includes an outlet pipe 18 connected to the cage, in a conventional manner not shown, and an elongated L-shaped inlet pipe 19 extended forwardly from the blower and thence downwardly, as illustrated in dashed lines, for connection in a manner to be described.

An elongated control shaft 24 is journaled in the tractor 10 in substantially horizontal position and extends transversely of the direction of travel of the tractor above the forward drive wheels 11. A pair of elongated elevational control levers 25 is rigidly secured to the shaft in longitudinally spaced relation therealong and radially forwardly extended therefrom. A pair of sector plates 26 is also rigidly radially upwardly extended from the control shaft in individual adjacent relation to the control levers and forming therewith a pair of bell cranks. A pair of arcuately spaced studs 27 is upwardly extended from each sector plate for engagement with stops 28 rigidly mounted on the tractor 10 adjacent to their respective sector plates. The studs engage their respective stops incident to rocking of the control shaft thereby to limit elevational movement of the levers. Elevational control links 34 are individually pivotally connected to the levers forwardly of the shafts 24 and are downwardly dependent therefrom.

The tractor 10 is adapted for earth traversing movement in predetermined directions of travel determined by the forward drive wheels 11 and a rear guide wheel, not shown, but well-known. For purposes of convenient reference and for describing the operation of the subject machine, the tractor is adapted to travel along a row of cotton plants, indicated at 30 in FIG. 3, so that the drive wheels straddle the row of plants to be picked.

A picking unit 35 embodying the principles of the present invention includes an upright belt housing 36 which is generally trapezoidal in horizontal cross section, as best viewed in FIG. 3. The housing includes a horizontal upper wall 37, a side wall 38 downwardly extended from the upper wall, a horizontal partition 39 in vertically spaced relation to the upper wall and connected to the side wall and a horizontal bottom wall 40 connected to the side wall in vertically spaced relation below the partition. The side wall includes a rearwardly inwardly extended front plant gathering panel 41, an inwardly forwardly extended rear panel 42, and an outer panel 43 interconnecting the front and rear panels and substantially parallel to the direction of travel of the tractor 10. Additionally, the outer wall includes a fractionally cylindrical doffer housing 44 for a purpose to be described and has an elongated upstanding cotton passage 45 adjacent to the bubble. It is also to be observed that the front and rear panels terminate short of each other and define therebetween a lateral opening 47 for the belt housing opposite to the outer panel.

The picking unit 36 further includes a plurality of spaced horizontal forward and rearward braces 55 rigidly laterally extended from the forward and rearward panels 41 and 42 transversely of the path of movement of the tractor 10 and adjacent to the upper wall 37 so as to be above the cotton plants 30. An upstanding forward plant gathering plate 56 and a rearward plate 57 are rigidly mounted on the braces and respectively inwardly convergently extended with respect to their adjacent forward and rearward panels 41 and 42. The plates lie on the opposite side of the row of plants 30 being picked from the panels and define therewith front and rear cotton plant admitting and exit passages. Elongated vertically spaced, longitudinally extending trusses 58 rigidly interconnect the plates in the described positions, and an outer upstanding side plate 59 rigidly interconnects the plates outwardly of the trusses. The front, rear and side plates define a compressor housing 60.

A pair of brackets 61 is downwardly extended from opposite sides of the tractor 10 rearwardly of the drive wheels 11. Elongated substantially rigid stabilizing rods 62 provide rear ends pivotally connected to adjustable mounting screws 63 individually supported in the brackets, and forward ends individually pivotally connected to the belt and compressor housings 36 and 60 of the picking unit 35 in transversely spaced relation on opposite sides of the picking zone. The stabilizing rods accommodate elevational movement of the picking unit by the shaft 24 and maintain the unit in proper attitude notwithstanding such elevational adjustment.

A substantially rectangular, upstanding, plant compressing sheet 65 provides upper and lower edges, front and rear vertical edges, and an inwardly disposed surface 66. A plurality of compression springs 67 are mounted on the trusses and extend horizontally inwardly thereof toward the frame 38. The sheet is mounted on the springs with the forward edge of the sheet inwardly overlapping the rearward edge of the plant gathering plate 56 and with the rearward edge of the sheet outwardly overlapping the forward edge of the plate 57. The sheet has a plurality of corrugations 68 extended transversely vertically of the sheet, as evident in FIG. 3. The sheet is opposite to the lateral inward opening in the belt housing 36 and is yieldably urged inwardly toward the belt housing, and thus against the cotton plants 30, during movement of the tractor 10 along the row of plants.

Upright front and rear outer drums 75 and 75′ and front and rear inner drums 76 and 76′ are individually rotatably mounted in the upper and lower panels 39 and 40 of the housing 36 for individual rotation about their longitudinal axes. The axes of the inner drums are disposed in a substantially vertical plane aligned with the path of movement of the tractor and in relatively adjacent, laterally spaced relation to the compressing sheet 65 on the opposite side of the row of cotton plants 30 to be picked from the sheet. The outer drums are located in the front and rear outer corners of the housing with their axes in a vertical plane parallel to the plane of the axes of the inner drums. Further, the axes of adjacent front inner and outer drums and of adjacent rear inner and outer drums are located in upright planes in inwardly spaced relation to the front and rear panels 41 and 42, respectively, all as best seen in FIG. 3.

Each of the drums 75, 75′ and 76, 76′ include a shaft 77a, 77b, 77c, and 77d individually journaled in bearings 78a, 78b, 78c, 78d, 78e, 78f, 78g, and 78h respectively mounted in the partition 39 and on the bottom wall 40, as illustrated. Further, sprockets 79 are connected to the shafts and, as best seen in FIG. 3, an elongated endless chain 80 is extended around the sprockets in mesh therewith for effecting a unitary rotation of the drums.

A power take off shaft is provided on the tractor 10 and is generally indicated by the numeral 82 in FIG. 1. A drive bevel gear 83 is provided on the power take off shaft and is in mesh with a driven bevel gear 84 on the shaft 77c of the rear inner drum 76′ for imparting rotation to this drum, and through the chain 80, rotating the other drums.

An elongated endless flexible belt 90 is extended around the drums 75, 75′ and 76, 76′ and is of substantially the same width as the compressing sheet 65 between its upper and lower edges. The belt has upper and lower edges 91 and 92 in adjacent spaced relation to the partition 39 and to the bottom wall 40, and an outwardly disposed surface 94. A plurality of tufts 96 of elongated, somewhat resiliently flexible, although somewhat stiff, bristles 97 are extended outwardly from the surface of the belt and are connected to the belt in any suitable manner. The bristles in each tuft are preferably slightly outwardly divergently fanned in generally conical arrangement about concentric axes substantially normal to the surface of the belt.

The belt 90 is thus mounted for circuitous travel along a picking run 100 in opposed, substantially parallel, spaced relation to the compressing sheet 65 on the opposite side of the row of cotton plants 30 from the sheet, a return run 101 in laterally outwardly spaced parallel relation to the picking run, and forward and rearward runs 102 and 103, respectively, interconnecting the picking and return runs in inwardly spaced, parallel relation to the front and rear panels 41 and 42. The belt is preferably spaced from the belt housing 36 by an amount slightly greater than the tuft length. The picking run and the compressing sheet define a picking, or gathering, zone 104 therebetween through which the cotton plants move during earth traversal of the tractor 10 and in which the plants are considerably compressed between the sheet and belt. Also, for purposes of reference, the belt moves the tufts 96 successively through the picking zone wherein they engage cotton plants 30 therein and thence out of the picking zone along the rearward run into a doffing zone, generally indicated at 105.

A doffer 110 includes an upstanding shaft 111 mounted in the partition 39 and the bottom wall 40 of the belt housing 38 in laterally outwardly adjacent spaced relation to the outer rear drum 75′ and in the doffer housing 44. The doffer includes a plurality of axially spaced, circular doffing discs 112 rigidly radially extended from the shaft, having a plurality of circumferential teeth 113, and individually peripherally extended between the rows of tufts 96 on the belt 90. A drive sprocket 115 is connected to the shaft 77d of the rear outer drum; a driven sprocket 116 is connected to the doffer shaft substantially in the plane of the drive sprocket; and an elongated endless chain 117 circumscribes these sprockets and is in mesh therewith so that the doffer is rotated incident to rotation of the belt.

An elongated cotton collecting tube 120 is mounted on the side wall 38 of the belt housing 36 adjacent to the bubble 44 and includes an elongated forwardly disposed window 121 in registration with the cotton passage 45 at the doffing station 105 for receiving cotton removed from the bristles 97 by the doffing discs 112. The tube is connected to the inlet pipe 19 so that a suction is created at the window to draw cotton into the tube and upwardly by means of the blower 17 into the cage 16.

Well-known counterbalancing units 130 are included, and an hydraulic system is also provided having two-way elevating rams 131 pivotally interconnecting the tractor 10 and the counterbalancing units for enabling rocking of the control shaft 24 to raise and lower the picking unit 35. A handle 132 is upwardly extended forwardly of the operator's seat 12 and is connected, in a manner well-known but not shown, to an hydraulic system for extending and retracting the rams.

Operation

The operation of the described embodiment of the subject invention is believed to be readily apparent and is briefly summarized at this point.

With the blower 17 energized so as to create a suction at the window 121 of the collector tube 120 and at the opening in the belt housing 36 disposed adjacent to the picking run 100, the tractor 10 is driven down a row of cotton plants 30 with the forward drive wheels 11 in straddling relation to the row. Further, the tractor is steered so as to bring the picking zone, between the picking run and the compressing sheet 65, substantially into alignment with the row. The cotton plants are gathered inwardly and compressed relatively together by the forward plant gathering plate 56 and panel 41 and as the tractor moves along, these gathered and compressed plants pass into the picking zone and between the compressing sheet and the picking run.

Earth traversing movement of the tractor 10 imparts motivation to the belt 90 in its circuitous or orbital path of travel. This moves the belt in a clockwise direction, as viewed in FIG. 3, and at a linear speed substantially equal to the forward linear speed of the tractor. It is to be observed that as the belt travels along its picking run 100, the belt is moving in a direction opposite to the forward direction of travel of the tractor.

During movement of the tufts 96 through the picking zone, the bristles engage the cotton plants 30 and are thereby flexed slightly outwardly from their relaxed positions when outside of said picking zone. More specifically, certain of the bristles impale balls 135 of cotton with which they contact. Inasmuch as the bristles are moved at the same linear speed rearwardly through the picking zone as the forward linear speed of the tractor 10, there is no appreciable relative motion between any particular tuft and the ball of cotton which it impales. However, the sheet 65 moves slidably over the cotton plants in the picking zone and, because of the corrugations 68, moves the cotton plants laterally inwardly and outwardly relative to the bristles. This tends to work the balls of cotton slidably inwardly on bristles on which they are impaled. The springs 68, of course, yieldably urge the sheet toward the cotton plants both to maintain the plants in compressed condition and to facilitate the described action of the corrugations on the plants.

As the tractor 10 moves forwardly, the cotton impaling bristles 97 successively move rearwardly outwardly of the picking zone along the rearward run 103. In so doing, they disengage the cotton plants 30 and resiliently return to their relatively contracted non-flexed conditions so as to grasp the cotton impaled between the individual bristles of each tuft 96. Thus, the balls 135 of cotton are pulled or picked from the cotton plants and carried by the tufts along the rearward run of the belt 90.

As the cotton carrying tufts 96 turn the rear outer corner of their path and enter on the return run 101 of the belt 90, they move past the window 121 of the collector tube 120 and also into engagement with the doffer 110. The doffer, of course, is rotated incident to rotation of the belt 90 so that the doffing discs 112 are constantly moved between the rows of tufts 96. As viewed in FIG. 3, the doffing discs rotate in a clockwise direction so that the adjacent peripheries of the discs and the belt travel in opposite directions. This moves the teeth of the discs against the cotton in the bristles to extract the cotton from the bristles and allow it to be drawn into the collector tube by the described suction whereupon the cotton is carried upwardly by means of the blower 17 and into the cage 16.

Second Form

Figure 4:
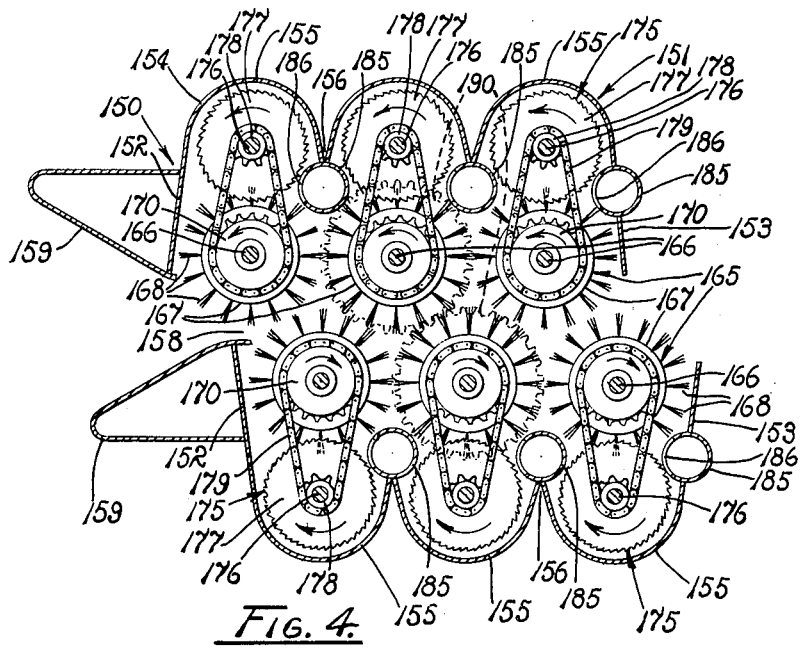
FIG. 4 is a horizontal sectional view, similar to FIG. 3, of a second form of the present invention.

With reference to FIG. 4, a cotton picking machine, generally indicated by the numeral 150, is illustrated embodying a second form of the present invention. This machine includes a pair of housings 151 providing front and rear panels 152 and 153 extended transversely of the direction of travel of the machine, and side walls 154 interconnecting the panels and providing a plurality of vertically disposed, substantially fractionally cylindrical portions 155 meeting in inwardly disposed joints 156. The housings are disposed in the machine on opposite sides of a picking zone 158, and forwardly extended, substantially U-shaped plant gatherers 159 are mounted on the front panels for gathering cotton plants, not shown, in a row along which the machine is traveled and guiding such plants into said picking zone.

A plurality of picking drums 165 include substantially vertical shafts 166 rotatably mounted in the machine 150 on opposite sides of the picking zone 158, with the shafts on opposite sides of the zone being in transversely staggered, longitudinally spaced relation to each other. The drums have concentric cylindrical surfaces 167, and a plurality of circumferentially extended, axially spaced rows of tufts 168 of elongated, resiliently flexible, somewhat stiff, bristles are substantially radially outwardly extended from the outer surface of each drum. The tufts in each row of tufts are in circumferentially spaced relation. The drums are of lengths greater than the height of the cotton plants to be picked, as will be evident. Sprockets 170 are individually rigidly secured to the drums 165.

A plurality of doffers 175 are individually provided with shafts 176 rotatably mounted in vertical positions in the bubbles 155 of the housings 151 and individually outwardly adjacent to the picking drums 165. Each doffer includes a plurality of axially spaced radially extended doffing discs 177 peripherally extended between the rows of tufts 168 on its associated picking drum 165. More specifically, the tufts are in peripherally overlapping relation with the discs when the same are in adjacent relation. Sprockets 178 are also secured to the doffers concentrically of their respective shafts, and chains 179 individually extend around the sprockets of associated drums and doffers.

Elongated collector tubes 185 are mounted in the housings 151 at the joints 156 and in the rear panels 153 and provide elongated upstanding windows 186 directed toward doffing stations where the drums 165 and associated doffers 175 are in peripherally overlapping relation. Although not shown, suction is applied to the collector tubes in the same manner as described above in connection with the tube 120.

Meshing gears 190 are secured to the center picking drums 165. Although not shown, sprockets and chain systems connect each center drum shaft 166 to the front and rear drum shafts for unitarily power driving the picker drums and doffers 175 on each side of the picking zone 158. Actually, powered driving mechanism may be connected to any one of the shafts 166 or 176 and thereby impart rotary movement to all of the drums 165 and doffers 175. Inasmuch as this drive mechanism forms no particular part of the subject invention, however, it is not described in any greater detail. It is further to be understood that the housings 151 are interconnected in rigid association and are, in turn, mounted on a tractor, as 10, by the usual control links, as 34, and stabilizing rods, as 62. To effect drive, for example, the center shaft 166 is connected to the power take off shaft 82 in FIG. 1 by the use of bevel gears, as 83 and 84.

In operation of the second form of the subject invention, the machine 150 is driven along a row of cotton plants to be picked so that the plants are gathered into the picking zone 158 in relatively compressed relation therein. The drums 165 and doffers 175 are rotated so that the tufts 168 when passing through the picking zone move rearwardly relative to the forward direction of travel of the machine and at a linear speed substantially equal to the forward linear speed of the machine. As described above, this means that the tufts do not move relative to the cotton plants in the picking zone.

As before, the bristles in the tufts 168 passing through the picking zone 158 impale balls of cotton with which they come into contact and, upon moving out of said picking zone, pick such balls of cotton from the plants and move the same into the doffing stations of their respective drums 165. The doffing discs 177 are rotated so that their peripheries travel in the opposite direction to the peripheries of the drums when the same are in adjacent relation so as to engage cotton impaled on the bristles and throw it toward the adjacent windows 186 of the collector tubes 185. The suction applied to the tubes draws the cotton therein for movement into a collecting cage, as 16, in the first form of the invention. As with the first form of the invention, the bristles tend to flex outwardly into relatively open positions when engaging the cotton plants so as more easily to impale the cotton and, upon disengaging the plants, return to relatively contracted or closed positions so as to grasp the cotton impaled and hold it on the bristles until the doffing station is reached.

The provision of two sets of picking drums 165 on opposite sides of the picking zone 158 provides a unique cooperative action. Thus each set of drums and their associated tufts 168 urge the cotton plants and balls of cotton toward the other set of drums.

The pressure exerted by the sets of drums varies longitudinally of the picking zone. Thus, as the machine moves forwardly and the plants are opposite a drum, they are moved relatively inwardly of the row. When the plants are between a pair of longitudinally adjacent drums in a set of drums, this pressure is relieved so that there is a tendency for the plants to move relatively outwardly of the row. Actually, the plants are moved transversely back and forth by the drums while the plants are in the picking zone. Accordingly, the sets of drums have an effect on the plants similar to the compression sheet 65.

From the foregoing it will be evident that a cotton picking machine has been provided with obviates many of the disadvantages of the conventional machines for the purpose. The intricate machinery requiring precise construction and constant maintenance of the prior art has been eliminated and, in lieu thereof, a relatively more rugged belt mounting tufts of bristles and drums mounting such tufts have been provided for picking the cotton. In addition to simplifying the construction and reducing the weight of the machine, the described structure provides a highly effective picking action. Although the machine has been described in connection with picking cotton from plants thereof, it is to be understood that it has more general utility as a material gathering apparatus where similar problems are involved.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a machine for picking cotton from plants, a housing mounted on the machine for earth traversing movement, an upstanding plant compressing sheet of substantially rigid material mounted in the housing, a plurality of tufts of elongated bristles of resiliently flexible material, means in the housing collectively mounting the tufts for movement in a substantially horizontal circuitous path past the compressing sheet, the bristles of each tuft being adapted to impale cotton on such plants during such movement past the compression sheet and being flexed outwardly incident to said engagement into open positions facilitating such impalement, the bristles further being resiliently contractible into closed positions around cotton impaled thereon upon movement out of the picking run.

2. The machine of claim 1 wherein the sheet is corrugated transversely of the path of movement of the tufts therepast.

3. The machine of claim 1 wherein the tuft mounting means is an endless flexible belt.

4. The machine of claim 1 including means mounted in the housing along said circuitous path for doffing cotton impaled on the bristles.

5. In a machine for picking cotton from plants, a housing mounted on the machine for earth traversing movement, a substantially rectangular upstanding plant compressing sheet of substantially rigid material mounted in the housing; an elongated endless flexible belt having an outer surface; a plurality of tufts of elongated bristles of resiliently flexible, somewhat stiff material connected to the belt and extended outwardly from the outer surface thereof; means mounting the belt in upstanding position in the housing for revolutionary travel in a circuitous path about an upright axis, the belt having an elongated substantially straight picking run in laterally spaced substantially parallel opposed relation to the compressing sheet and adapted to be positioned on opposite sides of the plants, a return run in laterally outwardly substantially parallel spaced relation to the picking run, and spaced forward and rearward runs interconnecting the picking and return runs; and drive means borne by the housing and connected to the belt mounting means for moving the belt in said predetermined path thereby to carry said bristles in said path and into engagement with cotton plants while traveling past the sheet along said picking run whereby the bristles are spread arcuately outwardly into fanned relation, the bristles further being adapted to impale cotton on such plants during said picking run and while in said fanned relation and subsequently resiliently contracting so as to grasp cotton impaled upon leaving the picking run and traveling along the rearward run.

6. The machine of claim 5 wherein the sheet is mounted in the housing for movement laterally toward and away from the picking run of the belt, and including means mounted in the housing and engaging the sheet for yieldably biasing it toward said picking run.

7. The machine of claim 6 wherein said biasing means includes a plurality of compression springs bearing against the sheet on the opposite side thereof from the picking run of the belt.

8. The machine of claim 5 wherein the sheet is provided with a plurality of upstanding corrugations extended transversely of the path of travel of the bristles past the sheet and wherein the sheet slidably engages cotton plants during movement past the plants in the picking run whereby the corrugations work the cotton balls on the plants longitudinally inwardly of the bristles impaling such balls.

9. The machine of claim 5 wherein the housing is adapted to be motivated by the machine at a predetermined speed, and including drive means connected to the belt mounting means for motivating the belt at substantially the same linear speed as said predetermined speed and so that the picking run travels in the opposite direction of movement from the movement of the housing whereby the bristles are relatively stationary with respect to cotton plants along the picking run but are movable relative to the sheet.

10. The machine of claim 5 wherein the belt and the sheet have substantially the same width measured vertically thereof and wherein the tufts are arranged on the belt in a plurality of transversely spaced rows circumscribing the belt.

11. The machine of claim 10 wherein the bristles are successively travel from said picking run to a doffing station spaced circumferentially of the belt from the picking run, said machine further including an elongated doffer having an upstanding shaft rotatably mounted in the housing at said doffing station and a plurality of axially spaced doffing discs rigidly radially outwardly extended from the shaft and peripherally interposed between the rows of bristles for engaging and removing cotton impaled on the bristles incident to rotation of the shaft and movement of the belt past the doffer, means connected to the shaft for imparting rotation to the doffer so that the peripheries of the discs travel in the opposite direction to the belt when in adjacent relation, and a cotton collector mounted in the support adjacent to the doffer for receiving cotton removed from the bristles by the doffer.

12. The machine of claim 11 wherein the housing includes a side wall in laterally outwardly spaced relation to the forward, rearward and return runs of the belt and accommodating movement of the tufts and a lateral opening opposite to the picking zone accommodating movement of the picking run, the side wall having an outwardly extended arcuate portion enclosing the doffer and a cotton passage adjacent to the arcuate portion, the collector being an elongated tube mounted on the side wall of the housing and providing a window registering with the cotton passage, and including means for applying suction to the tube for withdrawing cotton removed from the tufts by the doffer through the passage and the window into the tube.

13. In a cotton picking machine, a housing having a plurality of interconnecting vertical walls, said walls providing an opening into the housing, a vertically disposed endless belt mounted within the housing, said belt having an outer surface providing a longitudinally extended picking run disposed within said opening, a plurality of tufts of bristles mounted on the outer surface of the belt, means to drive said belt along said picking run in the opening, rotatable doffing means vertically rotatably mounted in the housing adjacent to said bristles and opposite to said picking run, means to rotate said doffer means incident to said movement of the belt, a pneumatic conveyor duct mounted on the housing adjacent to said doffer means and the bristles, and a resiliently mounted pressure plate carried by the housing in laterally spaced relation to said picking run of the belt defining a cotton plant passageway therebetween whereby the plate is urged towards said picking run to compress the cotton plants and cause such cotton to be impaled upon said bristles.

14. A cotton picking unit adapted to be attached to a mobile vehicle, said unit comprising a belt housing having a vertical longitudinally extending outer wall, a vertical rearwardly inclined front plant gathering wall and a vertical forwardly inclined rear wall, said front and rear walls defining an opening spaced laterally from said outer wall, a vertically disposed endless belt mounted within said housing, said belt having a longitudinally extending picking run disposed within said opening, a rear run disposed adjacent said rear wall, a return run disposed adjacent said outer wall and a forward run disposed adjacent said front wall, a plurality of tufts of bristles mounted on the outer surface of said belt, means operatively associated with said belt to drive same with the belt moving rearwardly during the picking run, a vertically extending arcuate doffer housing disposed between the rear portion of said outer wall and said rear wall, rotatable doffing means mounted in said doffer housing adjacent said bristles, means operatively associated with said doffer means to rotate same, a pneumatic conveyor duct operatively associated with said doffing means and said bristles, compressor means laterally spaced from and operatively associated with said belt housing, said compressor having a vertical rearwardly inclined gathering plate, a longitudinally extending outer side plate and a vertical forwardly inclined rear plate, said gathering plate and rear plate defining an opening disposed adjacent said belt housing opening and a resiliently mounted pressure plate operatively associated with said gathering plate and rear plate and disposed within said opening, said pressure plate being laterally spaced from said picking run of said belt and defining therewith a plant passageway and picking zone.

References Cited in the file of this patent
UNITED STATES PATENTS

| | | |
|---|---|---|
| 193,702 | Graves | July 31, 1877 |
| 794,265 | Watson | July 11, 1905 |
| 1,763,607 | Watkins | June 10, 1930 |
| 2,140,631 | Johnston | Dec. 20, 1938 |
| 2,577,367 | Rust | Dec. 4, 1951 |
| 2,669,822 | Kinne | Feb. 23, 1954 |
| 2,815,635 | Shannon | Dec. 10, 1957 |
| 2,830,427 | Odom | Apr. 15, 1958 |